(12) United States Patent
Paquelet et al.

(10) Patent No.: US 10,374,681 B2
(45) Date of Patent: Aug. 6, 2019

(54) METHOD FOR PROCESSING INFORMATION REPRESENTATIVE OF A TRANSMISSION CHANNEL BY A RADIO EQUIPMENT DEVICE, RECEIVING EQUIPMENT AND ASSOCIATED COMPUTER PROGRAM

(71) Applicant: B<>COM, Cesson Sevigne (FR)

(72) Inventors: Stephane Paquelet, Rennes (FR); Remi Bonnefoi, Rennes (FR)

(73) Assignee: B<>COM, Cesson Sevigne (FR)

( * ) Notice: Subject to any disclaimer, the term of this patent is extended or adjusted under 35 U.S.C. 154(b) by 0 days.

(21) Appl. No.: 15/748,428

(22) PCT Filed: Jul. 19, 2016

(86) PCT No.: PCT/FR2016/051855
§ 371 (c)(1),
(2) Date: Jan. 29, 2018

(87) PCT Pub. No.: WO2017/017344
PCT Pub. Date: Feb. 2, 2017

(65) Prior Publication Data
US 2018/0219602 A1    Aug. 2, 2018

(30) Foreign Application Priority Data

Jul. 28, 2015   (FR) ...................................... 15 57184

(51) Int. Cl.
*H04B 7/06*     (2006.01)
*H04B 17/336*   (2015.01)
*H04B 7/0413*   (2017.01)

(52) U.S. Cl.
CPC ......... *H04B 7/0634* (2013.01); *H04B 7/0413* (2013.01); *H04B 17/336* (2015.01)

(58) Field of Classification Search
CPC ... H04B 7/0634; H04B 17/336; H04B 7/0413
See application file for complete search history.

(56) References Cited

U.S. PATENT DOCUMENTS

2006/0133273 A1* 6/2006 Julian .................. H04L 1/1671
370/230

OTHER PUBLICATIONS

International Search Report and Written Opinion dated Oct. 11, 2016 for International Application No. PCT/FR2016/051855, filed Jul. 19, 2016.

(Continued)

*Primary Examiner* — Sophia Vlahos
(74) *Attorney, Agent, or Firm* — David D. Brush; Westman, Champlin & Koehler, P.A.

(57) ABSTRACT

A method for processing information representative of a transmission channel between a radio transmitter and a radio receiver. The information includes a matrix representative of the transmission channel. The method includes obtaining at least one pair of eigencharacteristics of the product of the conjugate transpose of the channel matrix with the channel matrix, consisting of non-zero eigenvalues; obtaining a measurement of a signal to noise ratio in the transmission channel; calculating at least one eigenvalue of an autocorrelation matrix of the symbols on transmission, according to a criterion of maximizing a capacity of the transmission channel, from the eigenvalues obtained; and transmitting to the radio transmitter information representative of the at least one calculated non-zero eigenvalue associated with the eigenvector.

10 Claims, 9 Drawing Sheets

(56) References Cited

OTHER PUBLICATIONS

English Translation of the International Search Report and Written Opinion dated Oct. 11, 2016 for International Application No. PCT/FR2016/051855, filed Jul. 19, 2016.
Chen T-A et al: "On the Design of MIMO Block-Fading Channels With Feedback-Link Capacity Constraint", IEEE Transactions on Communications, IEEE Service Center, Piscataway, NJ. USA, vol. 52, No. 1, Jan. 1, 2004 (Jan. 1, 2004), pp. 62-70, XP011106837.
Wang Hengzhi et al: "On the design of hybrid limited feedback for massive MIMO systems", 2014 IEEE International Conference on Communications (ICC), IEEE, Jun. 10, 2014 (Jun. 10, 2014), pp. 4795-4800, XP032632384.
Alamouti, "A single transmitted technical diversity for wireless communications," published in Oct. 1998 in the journal IEEE Journal on Selected Areas in Communications, 16 (8): 1451-1458.
Lee et al, "MIMO technologies in 3GPP LTE and LTE-advanced," and published in the journal, EURASIP Journal on Wireless Communications and Networking, 2009.
A. Wiesel, Y. C. Eldar, and S. Shamai (Shitz), "Zero-forcing precoding and generalized inverses," published in IEEE Trans. on Sig. Proc., vol. 56, No. 9, pp. 4409-4418, Sep. 2008.
B. C Banister et al, "Feedback Assisted Transmission Subspace Tracking for MIMO systems", published in Apr. 2003 in the Journal IEEE J. Select. Areas Commun, vol. 21, No. 3, pp. 452-463.
Roger A. Horn and Charles R. Johnson, Matrix Analysis work, published in 1990 by Cambridge University Press, p. 53.
D.J.H. Garling, "Inequalities : a journey into Linear Algebra", 2007, p. 233.
E. Telatar, "Capacity of Multi-antenna Gaussian Channels", published in 1999 in the journal, European Transactions on Telecommunications, vol. 10, Issue 6, pp. 585-595, in Nov. 1999.
French Search Report and Written Opinion dated Apr. 15, 2016 for French Application No. FR1557184, filed Jul. 28, 2015.
French Search Report and Written Opinion dated Apr. 15, 2016 for corresponding French Application No. 1557184, filed Jul. 28, 2015.

* cited by examiner

METHOD FOR PROCESSING INFORMATION REPRESENTATIVE OF A TRANSMISSION CHANNEL BY A RADIO EQUIPMENT DEVICE, RECEIVING EQUIPMENT AND ASSOCIATED COMPUTER PROGRAM

CROSS-REFERENCE TO RELATED APPLICATIONS

This Application is a Section 371 National Stage Application of International Application No. PCT/FR2016/051855, filed Jul. 19, 2016, which is incorporated by reference in its entirety and published as WO 2017/017344 on Feb. 2, 2017, not in English.

1. FIELD OF THE INVENTION

The field of the invention is that of radio communication systems of the MIMO type (Multi Input Multi Output) and in particular the feedback by a receiver equipment to an equipment transmitting of information representative of the transmission channel.

The invention may especially, but not exclusively, apply to pre-coding antennas of the transmitting equipment to optimize the capacity of the transmission channel.

2. DESCRIPTION OF THE RELATED ART

In connection with FIG. 1, let us consider a diagram of an information transmission channel between a transmitter radio equipment comprising a plurality of transmission antennas and a receiver radio equipment comprising a plurality of reception antennas, according to the prior art.

Channel Coding:

The useful to transmit information are first subjected to a channel coding in which various operations (adding redundancy, interleaving, scrambling) are performed on the information bits to make the transmission more robust. Once the symbols have been received, the decoder can use the channel encoding system to correct channel-related errors.

Modulation:

The coded bit sequence is then modulated. Each sequence of N coded bits is associated a complex symbol. For example, for QPSK we have the modulation scheme introduced in connection with FIG. 2A.

In this case, for each sequence of 2 coded bits, a different complex value is associated.

$$00 \to \frac{1}{\sqrt{2}} + \frac{1}{\sqrt{2}}i$$

$$01 \to -\frac{1}{\sqrt{2}} + \frac{1}{\sqrt{2}}i$$

$$10 \to \frac{1}{\sqrt{2}} - \frac{1}{\sqrt{2}}i$$

$$11 \to -\frac{1}{\sqrt{2}} - \frac{1}{\sqrt{2}}i$$

As part of more complex modulation, the number of bits per symbol increases, as is the case for example for a 16-QAM shown in connection with FIG. 2B.

Precoding:

This block is specific to the use of several antennas. Its aim is to spread the symbols on the different antennas to get a focus of power transmitted on a network of special antennas and to limit interferences. This distribution can be done from precoders or space-time codes.

When using space-time codes, the same symbol can be sent multiple times. A law defines the moments and the transmission antennas of the symbol. The most common pattern today is that described by Alamouti in a paper entitled "A single transmitted technical diversity for wireless communications," published in October 1998 in the journal *IEEE Journal on Selected Areas in Communications*, 16 (8): 1451-1458, which only applies when the number of antennas at transmission and at reception is equal to 2.

The precoders make it possible to distribute a flow of symbols over all the transmitting antennas. It is possible to parallelize steams as shown by the example of FIG. 3, in which there is shown the distribution of symbols over three streams. Each stream is assigned a proportion of the total power. The streams are then multiplied by vectors of size t, which are the precoders and which apportion the different streams over the t antennas.

MIMO Decoding/Demodulation/Channel Decoding:

These different blocks carry out the processes that make it possible to find the useful bits. Their objective is therefore to carry out the opposite of the operations done before the emission of the symbols and to correct the errors generated by the channel.

Channel Estimation:

Some of the symbols sent by the transmitter are pilot symbols. These pilot blocks are known by the transmitter and the receiver which makes it possible to estimate the channel from the modifications they have undergone.

This estimate of the channel serves two purposes:
The receiver can use this knowledge of the channel to reduce the effects of the latter on the data received
It can also send back to the transmitter information on this matrix which will make it possible to adapt the precoding to the shape of the channel.

It shall be noted that the 3GPP LTE (Long Term Evolution) standard is based on a codebook which contains a small number of precoders, as described in the article by Lee et al, entitled "MIMO technologies in 3GPP LTE and LTE-advanced," and published in the journal «EURASIP Journal on Wireless Communications and Networking», in 2009 and extensive work on the pre-encoding, such as that of A. Wiesel, Y. C. Eldar, and S. Shamai (Shitz), entitled "Zero-forcing precoding and generalized inverses," and published in the proceedings of the IEEE Trans. on Sig. Proc., vol. 56, no. 9, pp. 4409-4418, a conference held in September 2008, seeking primarily to reduce interferences (zero-forcing precoding) which provides effective but complex precoders because their calculation requires the inversion of a matrix.

The document by B. C Banister et al, entitled «Feedback Assisted Transmission Subspace Tracking for MIMO systems», published in April 2003 in the Journal IEEE J. Select. Areas Commun, vol. 21, no 3, pp. 452-463, discloses a method for characterizing the downstream transmission channel between a transmitting equipment comprising a plurality of transmitting antennas and a receiving equipment comprising a plurality of receiving antennas. This method is based on the extraction of specific vectors of a matrix H*H, obtained by the product of the conjugate transpose, that is to say the transpose of the channel matrix H, wherein all the coefficients are conjugated, denoted H* by itself. It implements a so-called gradient algorithm that requires several successive channel estimates to converge. In this way, it determines the vector subspace in which the receiving equipment has received information from the transmitting equipment and therefore the directions in which the transmitting equipment must emit power to optimize the capacity of the transmission channel. The eigenvectors obtained are transmitted to the transmitting equipment in a feedback signal.

The article entitled "On the Design of MIMO Block-Fading Channels With Feedback-Link Capacity Constraint, by V. Lau et al, published in IEEE Transactions on Communications, vol. 52, in January 2004, discloses a method for calculating eigenvalues of autocorrelation matrix of symbols at transmission and for transmitting, via a receiving equipment of a feedback signal comprising at least one piece of information representative of the eigenvalues calculated and their associated eigenvectors, which satisfies a capacity constraint of the feedback channel. For example, this information includes an index with which the transmitting equipment matches pairs of eigenvalues and pre-recorded eigenvectors. This method is based on a knowledge of statistical properties of the transmission channel.

The article "On the Design of Hybrid Limited Feedback for Massive MIMO Systems" by H. Wang et al, published in the proceedings of the conference IEEE ICC Wireless Communications Symposium, in 2014, discloses another method for calculating the eigenvalues of an autocorrelation matrix of symbols at transmission and for transmitting a feedback signal comprising at least a portion of the calculated eigenvalues and their associated eigenvectors and which satisfies a capacity constraint of the feedback channel.

3. DISADVANTAGES OF THE PRIOR ART

A drawback, common to all three methods described is that they are complex to implement and requires major computing resources, since they seek to determine all the eigenvectors and the eigenvalues of a matrix H*H whose dimensions txt are potentially large in a MIMO communication context. Indeed, the number of transmission antennas t may be equal to 16, 32, 64 or 128 in a massively MIMO-based context.

4. OBJECTS OF THE INVENTION

The invention does improve the situation.
The object of the invention is in particular to overcome these shortcomings of the prior art.
Specifically, an object of the invention is to provide a solution for characterizing the channel and for configuring the MIMO precoding that effectively allows the transmitter to maximize channel capacity, while keeping a reasonable computational complexity for the receiver.

5. SUMMARY OF THE INVENTION

These objects, and others which will become apparent hereinafter are achieved with a method for processing information representative of a transmission channel between a radio equipment, so-called receiver (ER) comprising a plurality (r) of receiving antennas and at least one transmitting antenna, and a radio equipment, so-called transmitter (ET), comprising a plurality (t) of transmission antennas and at least one receiving antenna, the number of transmitting antennas (t) being greater than the number of receiving antennas (r), said information comprising a matrix (H) representative of the transmission channel (CH) previously estimated from at least one data signal received, said method comprising a step of obtaining eigencharacteristics of the product of the conjugate transpose of the channel matrix with the channel matrix, comprising non-zero eigenvalues and eigenvectors associated with said eigenvalues, characterised in that it comprises the following steps:

Obtaining a measurement of a signal to noise ratio in the transmission channel;

Calculating at least one eigenvalue of an autocorrelation matrix of the symbols at transmission, according to a criterion of maximizing a capacity of the transmission channel, from the (p) eigenvalues obtained, arranged in descending order and from the measurement (ρ) of the signal to noise ratio, according to the following equations:

$$0 \leq p \leq \mathrm{argmax}_{m \leq r} m^{-1}\left(1 + (rt\rho)^{-1} \sum_{k \leq m} \lambda_k^{-1}\right) > (rt\rho\lambda_m)^{-1}$$

$$\mu_i = \frac{1}{p}\left(1 + \sum_{j=1}^{p} \frac{1}{rt\rho\lambda_j}\right) - \frac{1}{rt\rho\lambda_i} \text{ for } 1 \leq i \leq p$$

$$\mu_i = 0, \text{ for } p < i \leq t$$

the non-zero eigenvalue ($\mu_i$) of the autocorrelation matrix ($Q_{op}$) being associated with the same eigenvector ($\mu_i$) as the eigenvalue ($\lambda_i$) of the product of the conjugate transpose of the channel matrix with the channel matrix (H*H);

Transmission of information representative of said at least one calculated non-zero eigenvalue associated with the eigenvector.

The invention makes it possible to calculate and transmit eigencharacteristics of the autocorrelation matrix of the symbols at transmission which maximizes the capacity of the transmission channel.

The invention thus provides an entirely new and inventive approach to the MIMO pre-coding which is to exploit the knowledge of at least some of the eigenvalues of the transmission channel to calculate a limited number p where p≤min (r, t) of eigenvalues of the autocorrelation matrix of symbols at transmission, which contributes to maximize the capacity of the transmission channel. It then transmits to the transmitting equipment information representative of these eigenvalues, which it can operate directly to configure its MIMO precoder and optimize the transmission channel.

According to one aspect of the invention, the method further comprises a step of extracting at least a couple of eigencharacteristics of the product of the channel matrix with the conjugate transpose of the channel matrix from the estimated channel matrix, said at least one pair including at least one non-zero eigenvalue and an associated eigenvector and, the non-zero eigenvalues of the product of the conjugate transpose of the channel matrix with the channel matrix (H*H) being identical to that of the product of the channel matrix with its conjugate transpose (HH*), said at least one eigenvector of the product of the conjugate transpose of the channel matrix by the channel matrix is obtained by performing the product of the eigenvector associated with at least one eigenvalue extracted from the product of the channel matrix by its conjugate transpose (HH*) with the conjugate transpose (H*) of the channel matrix.

The inventors were able to explain a relationship between the matrix HH* and the matrix H*H, which allows to derive the eigencharacteristics of each of them. The invention therefore proposes to calculate the eigencharacteristics of the matrix HH* which is smaller in size than the matrix H*H, and so reduce the complexity of the processing to be performed at the receiving equipment. The saving of resources allowed by the invention is all the more important as the ratio between the number of antennas on transmission and the number of antennas on reception is greater.

According to an advantageous characteristic of the invention, the step of extracting the eigenvalues of the product of the channel matrix with its conjugate transpose extracts the eigenvalues in order of decreasing values and comprises the following substeps:

Extracting a pair comprising the eigenvalue of largest magnitude and its associated eigenvector, by successive iterations of the product of the channel matrix with its conjugate transpose with an initial vector of dimension equal to the number of receiving antennas, the iterations being repeated until there is convergence towards an eigen direction of the transmission channel;

Obtaining a new matrix $(HH^*)_1$ by subtracting a product of the pair extracted from the product of the channel with its conjugate transpose;

and in that said sub-steps are repeated for the new matrix as long as a predetermined stop criterion is not satisfied.

With the invention, the eigenvalue of greater amplitude and its associated eigenvector are extracted from the matrix HH* by an iterative method, called "Power method". The initial vector is for example chosen randomly. A deflation method then makes it possible successively to obtain the eigenvalues in a descending order of values. The matrix resulting from the subtraction has the eigenvalue of the matrix (HH*) as the eigenvalue of greater amplitude. When the process stops, a number p of pairs of eigenvalues and eigenvectors is obtained. This number p is less than or equal to the number of non-zero eigenvalues of the optimal autocorrelation matrix.

One advantage is to further reduce the complexity of the method that calculates fewer eigenvalues. However, it turns out that not all eigenvalues are necessarily significant and therefore necessary for the transmitter, which makes this technique all the more interesting.

Several stopping criteria can be envisaged: For example, an estimate of a capacity gain provided by the current eigenvalue or a sizing/format constraint of the feedback signal to the transmitting equipment can be mentioned.

According to another aspect of the invention, the step of extracting eigenvalues of the product of the channel matrix with its conjugate transpose (HH*) extracts the eigenvalues in order of decreasing values and comprises the following substeps:

Iterative calculation of at least one geometrical power of the matrix product of the channel matrix with its conjugate transpose $(HH^*)2^n$, the number of iterations being a function of a predetermined convergence criterion;

Extracting a pair $(\lambda_1, v_1)$ comprising the eigenvalue $(\lambda_1)$ of greater amplitude and its eigenvector associated with product from at least a calculated geometrical power $(HH^*)2^n$ with an initial dimension vector (r).

Obtaining a new matrix $(HH^*)_1$ by subtracting a product of the pair extracted from the product of the channel matrix with its conjugate transpose (HH*);

and said substeps are repeated, as long as a predetermined stopping criterion is not satisfied.

An advantage of this embodiment is that the geometric convergence is faster and requires fewer iterations to obtain a pair composed of the eigenvalue and the sought eigenvector.

According to yet another aspect of the invention, the method further comprises a substep of judging a capacity gain associated with an $n^{th}$ eigenvalue extracted from a ratio between a first flowrate capacity associated with the n−1 preceding values and a second capacity associated with the n current values, a substep of deciding to take into account the $n^{th}$ eigenvalue by comparing the capacity gain $(G_C)$ calculated associated with the $n^{th}$ eigenvalue compared to a predetermined threshold $(S_C)$.

An advantage is that one takes into account for calculating the eigencharacteristics of the autocorrelation matrix and then only as those which provide significant and sufficient improvement in the capacity of the MIMO transmission system are transmitted. The computing resources at the receiving equipment and the transmitting equipment are saved as well as the bandwidth resources.

According to an advantageous characteristic, the stop criterion takes the decision made into account.

One advantage is that the process of extraction of eigenvalues is stopped, as soon as it is decided that the current eigenvalue did not bring a sufficiently significant gain for it at transmission to the transmitting equipment.

According to another advantageous characteristic of the invention, the stopping criterion also takes a feedback signal format into account.

One advantage is that the stopping criterion can take other constraints into account and for example limit the extraction to a certain number of pairs of eigenvalue/eigenvectors.

According to another aspect of the invention, following a new estimate of the transmission channel, the steps of the method are repeated and the substep of extracting of an $i^{th}$ pair takes as initial vector the $i^{th}$ eigenvector extracted during the previous implementation of the method.

The new channel estimate may be made at a later time or for another portion of the frequency band. An advantage of this embodiment is that, when the channel has hardly changed, the convergence of the extraction method of the pairs of eigencharacteristics is much faster.

The method which has just been described in its different embodiments is advantageously implemented by a device for processing information representative of a transmission channel between a radio receiver equipment, comprising a plurality of receiving antennas and a transmitter radio equipment, comprising a plurality of transmitting antennas, the number of transmitting antennas being greater than the number of reception antennas, said information comprising a matrix representative of the transmission channel previously estimated from at least one data signal received, said apparatus comprising a unit for obtaining eigencharacteristics of the product of the conjugate transpose of the channel matrix with the channel matrix, comprising non-zero eigenvalues and eigenvectors associated with said eigenvalues.

According to the invention such a device is particular in that it further comprises the following units:

Obtaining a measurement of a signal to noise ratio in the transmission channel;

Calculating at least one eigenvalue of an autocorrelation matrix of symbols at transmission, according to a criterion of maximizing a capacity of the transmission channel, from the eigenvalues obtained, arranged in descending order and the measurement of the signal to noise ratio, according to the following equations:

$$0 \le p \le \mathrm{argmax}_{m \le r} m^{-1}\left(1 + (rt\rho)^{-1}\sum_{k \le m}\lambda_k^{-1}\right) > (rt\rho\lambda_m)^{-1}$$

-continued $$\mu_i = \frac{1}{p}\left(1 + \sum_{j=1}^{p}\frac{1}{rt\rho\lambda_j}\right) - \frac{1}{rt\rho\lambda_i} \text{ for } 1 \le i \le p$$

$$\mu_i = 0, \text{ for } p < i \le t$$

the non-zero eigenvalue of the autocorrelation matrix being associated with the same eigenvector as the eigenvalue of the product of the conjugate transpose of the channel matrix with the channel matrix; and Transmission of information representative of the said least one non-zero eigenvalue calculated and its associated eigenvector.

Of course, the device for processing information representative of a transmission channel of the invention may be arranged to implement independently or in combination, all the embodiments which have just been described for the processing method.

Correlatively, the invention also relates to a radio communication equipment, so-called receiver, comprising a plurality of receiving antennas and at least one transmitting antenna, comprising the device for processing information representative of a transmission channel which has just been described.

The invention further relates to a computer program comprising instructions for implementing the steps of a method of processing information representative of a transmission channel as described above, when this program is executed by a processor.

This program can use any programming language. It can be downloaded from a communication network and/or recorded on a computer-readable medium.

The invention further relates to a computer-readable recording medium, whether or not incorporated in the device for processing information representative of a transmission channel and to the, optionally removable, device for processing a feedback signal according to the invention, which can respectively store a computer program implementing a method for processing information representative of a transmission channel, as described above.

6. LIST OF FIGURES

Other features and advantages of the invention will become evident on reading the following description of one particular embodiment of the invention, given by way of illustrative and non-limiting example only, and with the appended drawings among which:

Figure 6:
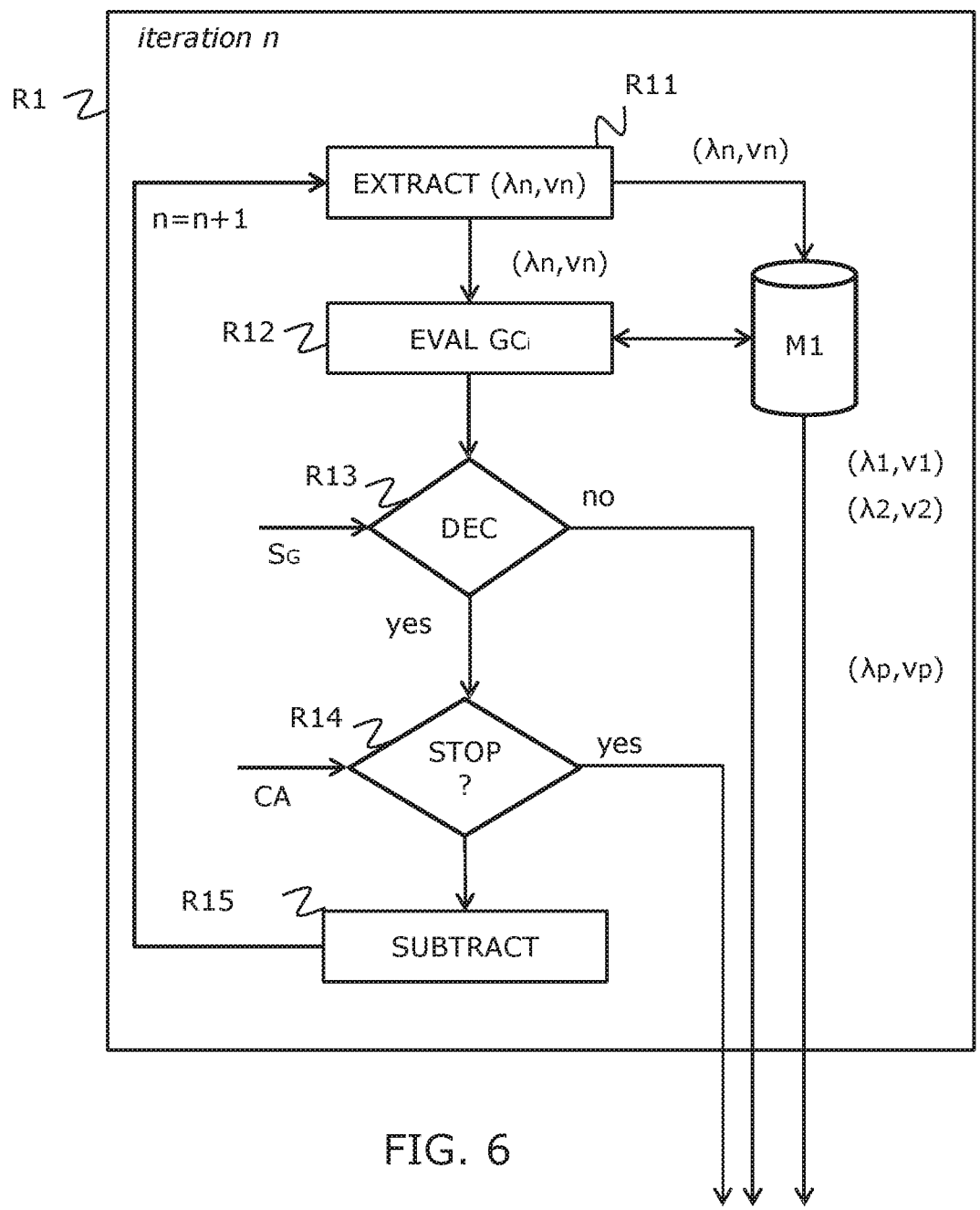
Figure 7A:
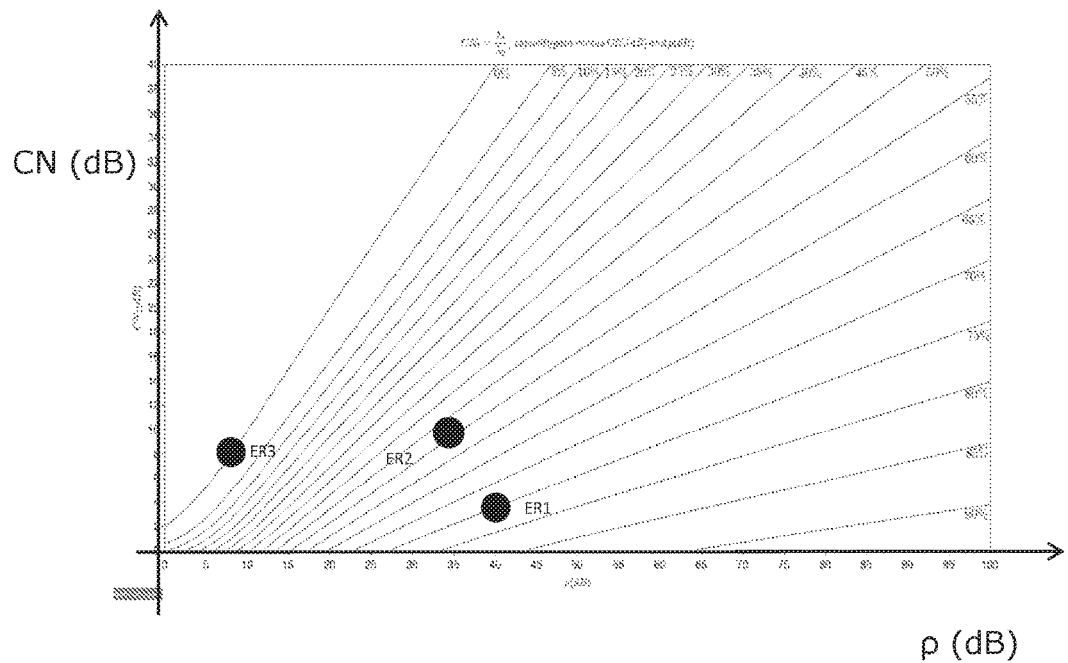
Figure 7B:
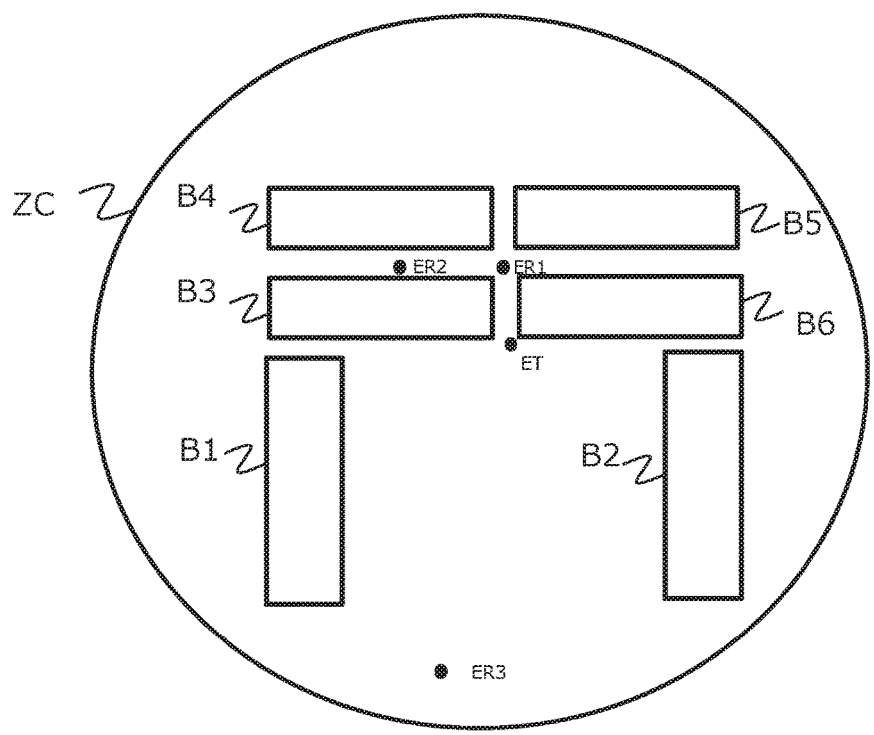
Figure 8A:
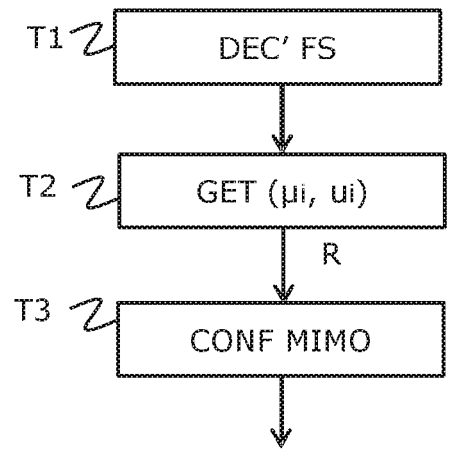
Figure 8B:
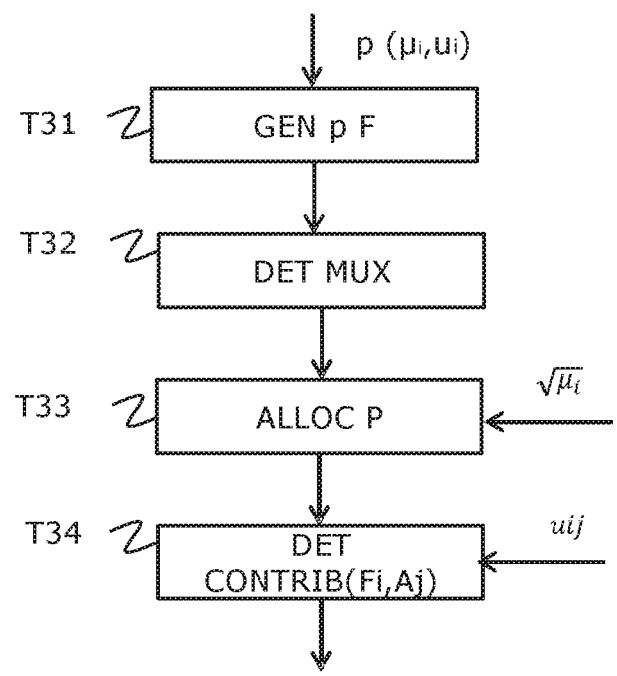
Figure 9:
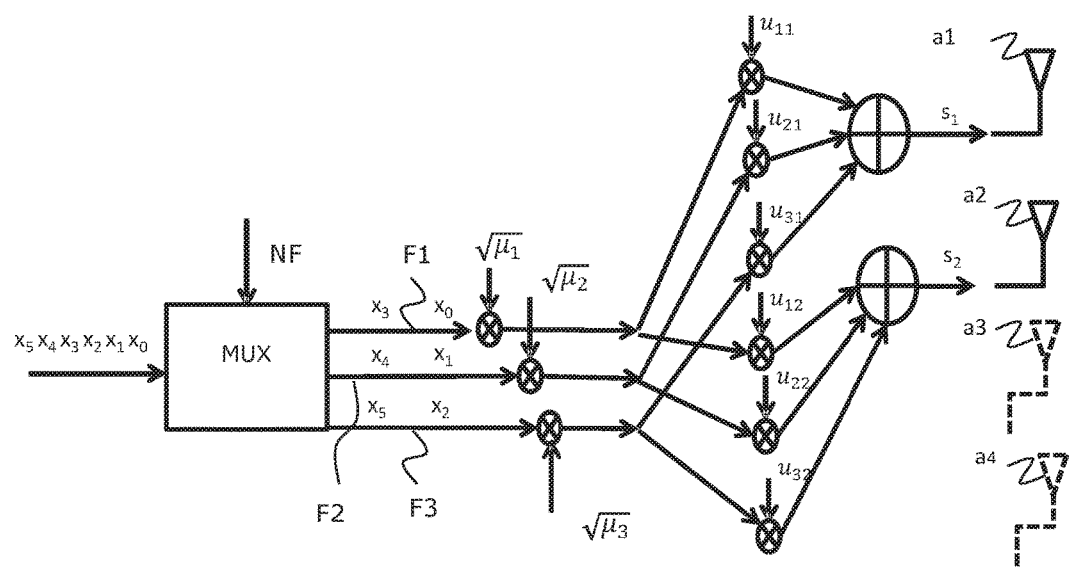
Figure 10:
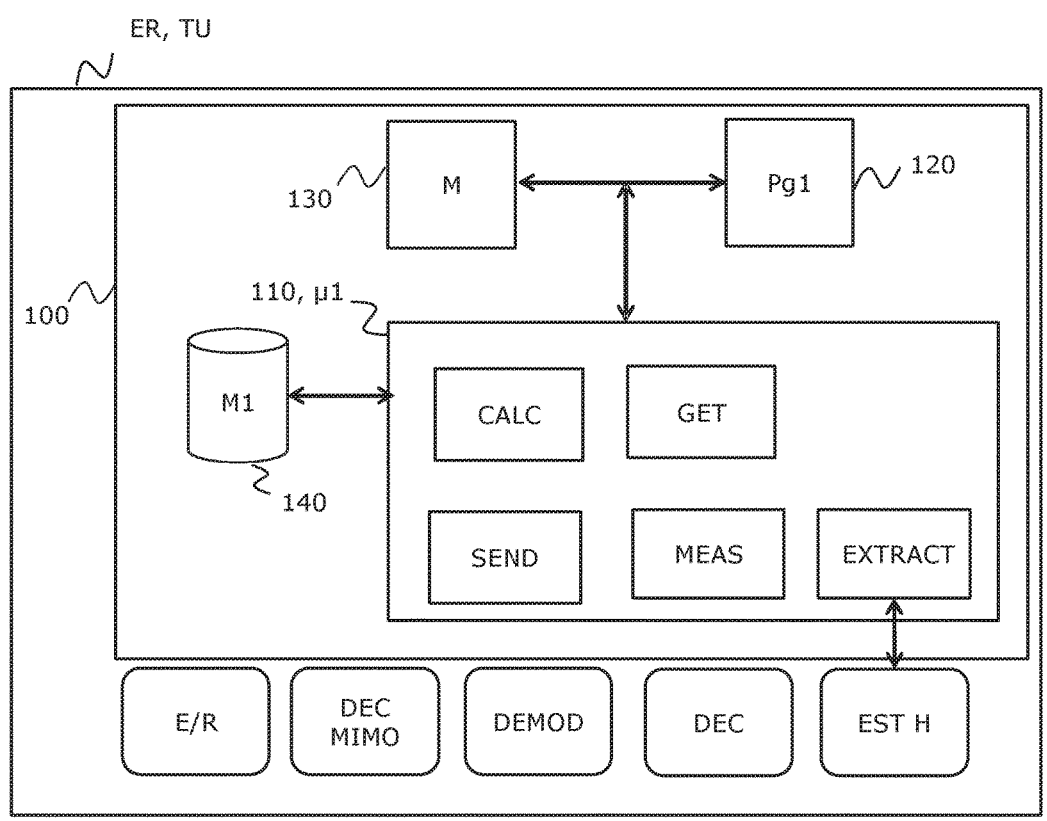
Figure 11:
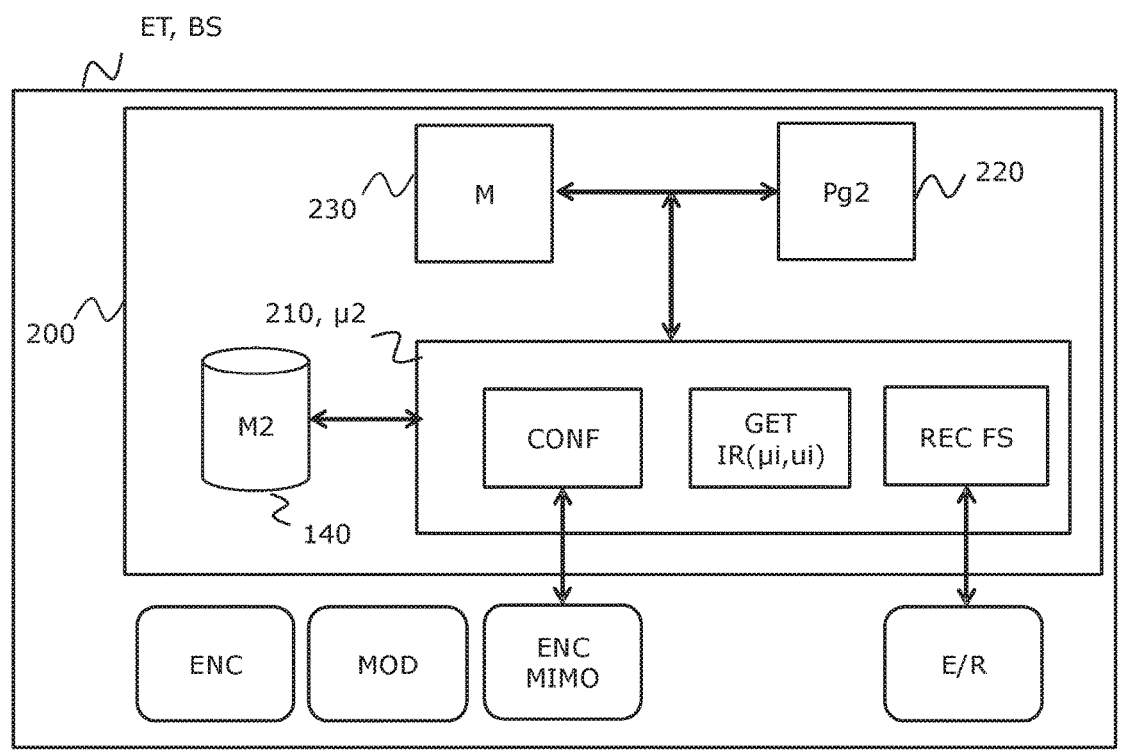

FIG. 6 describes more in detail the step of extracting the eigencharacteristics of a product of the channel matrix with its conjugate transpose according to one embodiment of the invention;

FIG. 7A illustrates a graphical representation of a capacity gain provided by the extraction of an additional eigenvalue and its eigenvector according to one embodiment of the invention, when the receiving device comprises two receiving antennas;

FIG. 7B shows an example of application of the invention to network planning;

FIG. 8A shows the steps of a method for processing a feedback signal received by a radio communication equipment, so-called transmitting equipment, according to an embodiment of the invention;

FIG. 8B details the step of configuring a MIMO precoding of the method for processing a feedback signal, according to an embodiment of the invention;

FIG. 9 describes more in detail the step of configuring the distribution of symbols at transmission over the plurality of transmission antennas, from the feedback signal information, according to one embodiment of the invention;

FIG. 10 schematically illustrates an exemplary hardware structure of a radio communication equipment, so-called receiving equipment, comprising a device for processing a payload signal according to one embodiment of the invention; and FIG. 11 schematically illustrates an exemplary hardware structure of a radio communication equipment, so-called transmitting equipment, comprising a device for processing a feedback signal according to one embodiment of the invention.

7. DESCRIPTION OF A PARTICULAR EMBODIMENT OF THE INVENTION

The general principle of the invention is based primarily on smart calculation of the eigencharacteristics of the product of the conjugate transpose of the channel matrix by itself, then the use of eigencharacteristics calculated to determine those of an autocorrelation matrix of the symbols at transmission which maximizes the capacity of the transmission channel and finally the insertion into a feedback signal of the pairs of eigenvalues and eigenvectors of this autocorrelation matrix which significantly contribute to maximizing the capacity of the transmission channel.

In the remainder of the description, let us consider in particular a MIMO context in which the transmitter has more antennas than the receiver. By t is denoted the number of antennas on transmission and r the number of antennas on reception, with t>>r.

In particular, a radio communication equipment, so-called receiving equipment ER is considered, comprising R receiving antennas and at least one transmitting antenna. For example, the receiver equipment ER is a mobile terminal, of the smart phone type or any other terminal capable of establishing a communication with a radio communication network, for example cellular according to a 3GPP standard, Wifi according to the IEEE 802.11 standard, or short range according to a standard of the BlueTooth, Zigbee type or other.

It is assumed that this equipment has previously received from a radio communication equipment, so-called transmitting equipment ET, comprising t transmitting antennas and at least one receiving antenna, at least one DS data signal over a transmission channel CH. The transmitter equipment ET is for example a base station of a communication network cellular radio of second generation (2G), an eNodeB equipment for a third or fourth generation network (3G, 4G), or any other compliant transmitter equipment in a future version of the 3GPP standard, or a base station (or "hotspot") for WiFi type radio communication network complying with the IEEE 802.11 standard.

From this signal, the receiving equipment ER has estimated the transmission channel CH and determined a channel matrix H of dimension r×t consisting of coefficients $h_{ij}$, such that i denotes the $i^{-th}$ receiving antenna of the equipment ER and j the $j^{-th}$ transmitting antenna of the equipment ET and i and j being integers, respectively between 0 and r−1, and 0 and t−1.

Figure 1:
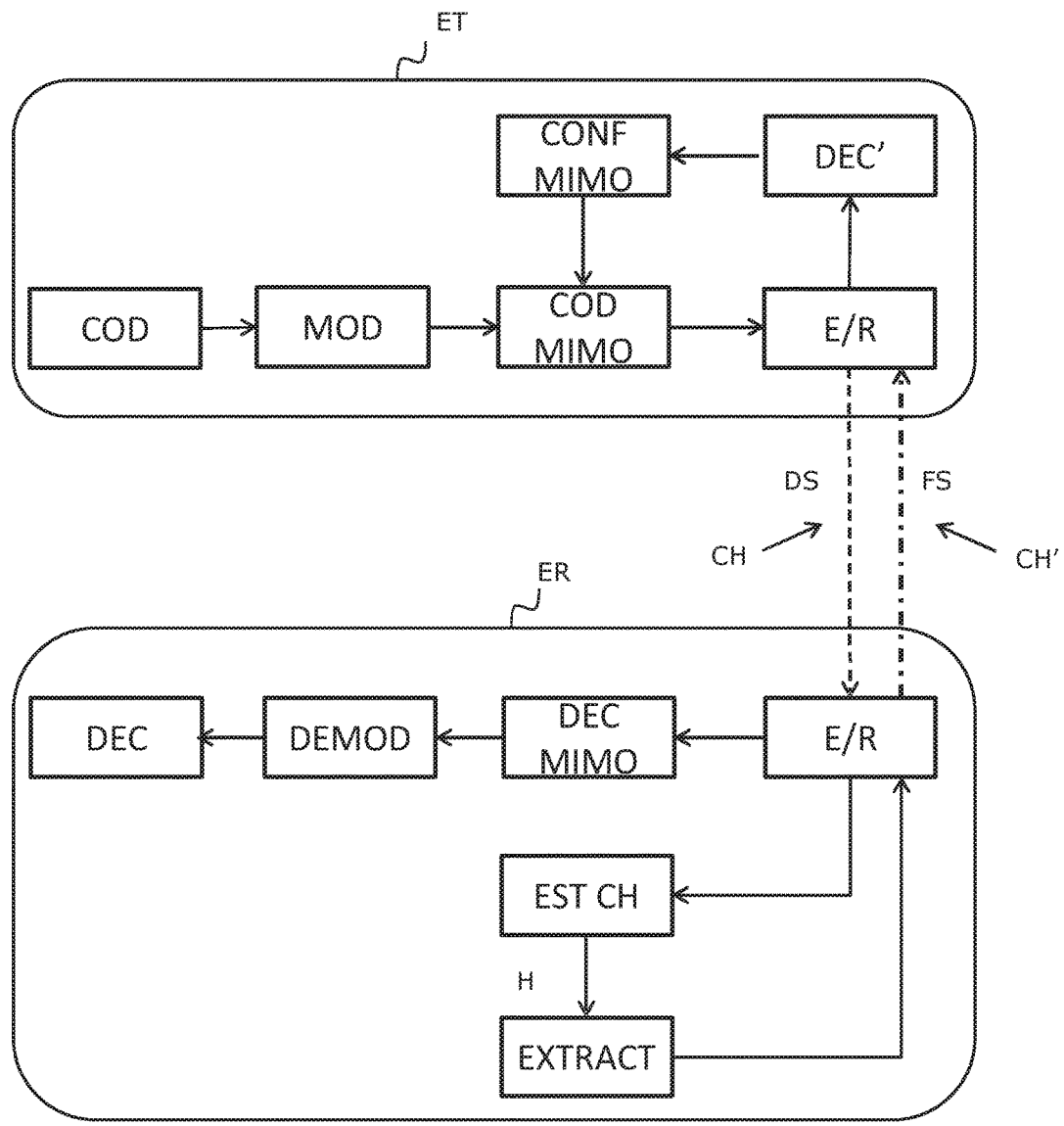
FIG. 1 (already described) illustrates schematically an exemplary MIMO communication channel according to the prior art.
Figure 2A:
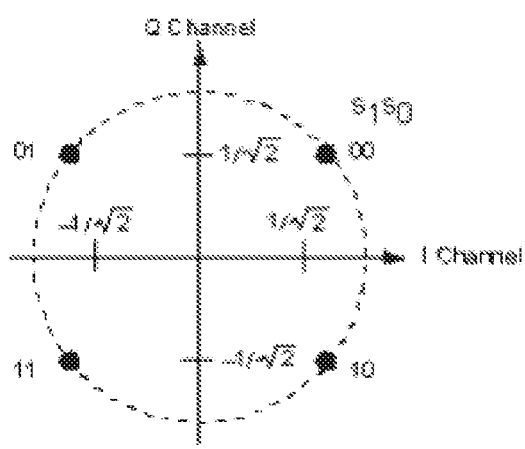
FIG. 2A (already described) shows a QPSK-type modulation scheme.
Figure 2B:
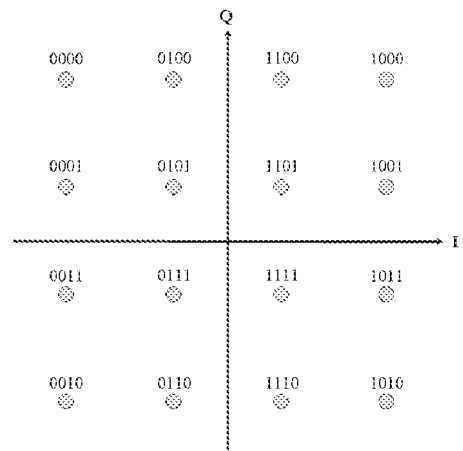
FIG. 2B (already described) shows a 16-QAM-type modulation scheme.
Figure 3:
FIG. 3 (already described) illustrates the principle of distribution of the symbols at transmission over the plurality of transmitting antennas by a MIMO precoder, according to the prior art.
Figure 4:
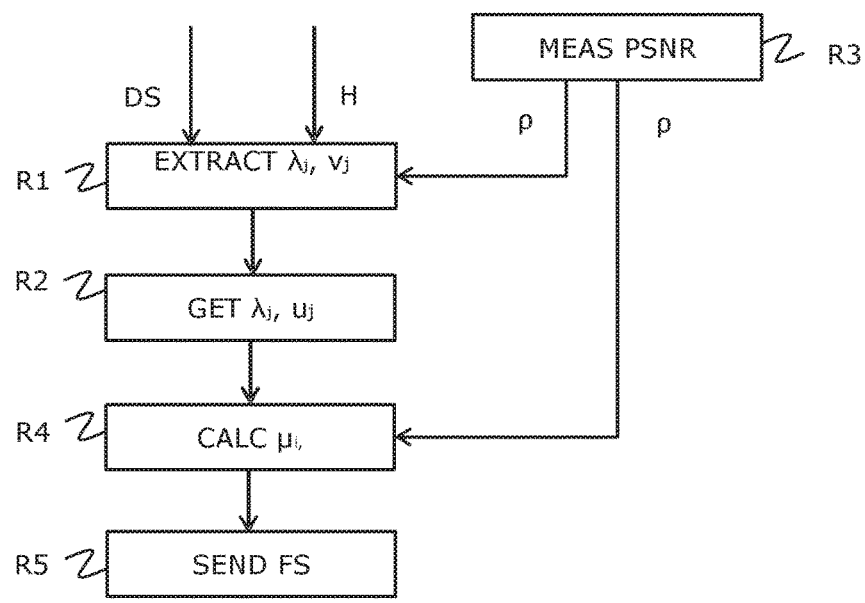
FIG. 4 shows the steps of a method for processing a payload signal received by a radio communication equipment, so-called receiving equipment, according to an embodiment of the invention.

In connection with FIG. 4, the steps of a method for processing information representative of a transmission channel according to an embodiment of the invention are described.

An object of the invention is to construct a precoder, that is to say a range of complex coefficients multiplying the symbols transmitted over the different transmitting antennas, which maximizes the capacity C of that channel.

This capacity C of the channel is expressed as follows, known to those skilled in the art:

$$C = \int_B \log_2(\det(I_r + rt\rho Q H^*H)) df \quad (1)$$

where $I_r$ is an identity matrix of dimension t×r, ρ denotes the signal to noise ratio measured for the transmission channel, for example from the payload signal DS received, Q an autocorrelation matrix of symbols at trace transmission (sum of diagonal elements) equal to 1 and H*H the product of the conjugate transpose of the channel matrix by itself, with a trace equal to 1 and B is the frequency band on which the signal is transmitted. The matrices H and Q and the signal to noise ratio are a function of frequency f.

The capacitance C of a transmission channel is the maximum theoretical throughput that can be achieved in this channel.

To maximize this capacity and build an optimal precoder, the coefficients of the autocorrelation matrix Q of the symbols at transmission can be acted upon, the other terms of the equation being determined.

The extraction of the eigencharacteristics of the matrix H*H is necessary for the construction of the optimal precoder. To extract these characteristics, three possibilities are available:

Decomposition into singular values of H of size r×t;
Decomposition into eigenvalues of H*H of size t×t;
Decomposition into eigenvalues of HH* of size r×r.

In the context of r≪t, the last possibility is much more advantageous, but it has not been exploited until today, since it is not obvious to establish a link between the eigencharacteristics of H*H and those of HH*.

The inventors have nevertheless managed to prove that:
the non-zero eigenvalues of the matrix product H*H and those of the matrix product HH* are the same; and that an eigenvector $v_i$ of the matrix H*H associated with the eigenvalue λi can always be obtained by the product of a eignvector of HH* associated with the eigenvalue λi by H* the conjugate transpose of H.

To prove these properties, we rely on the fact that H*H and HH* are positive Hermitian matrices and are therefore diagonalizable with eigenvalues greater than or equal to 0.

For a matrix A of size r×t and a matrix B of size t×r, the Matrix Analysis work of Roger A. Horn and Charles R. Johnson published in 1990 by Cambridge University Press, page 53 discloses the following equality on the characteristic polynomials:

$$(-\lambda)^t \det(AB - \lambda I_r) = (-\lambda)^r \det(BA - \lambda I_t) \quad (2)$$

By replacing A with H and B with H*, we have:

$$(-\lambda)^t \det(HH^* - \lambda I_r) = (-\lambda)^r \det(H^*H - \lambda I_t) \quad (3)$$

Therefore, the non-zero eigenvalues of H*H are equal to non-zero eigenvalues of HH* with their order of multiplicity.

The own subspace $E\lambda_i$ associated with the eigenvalue $\lambda_i$ of H*H and the eigensubspace $F\lambda_i$ associated with the eigenvalue $\lambda_i$ of HH* so have the same dimension that we will note $\alpha_1 \cdot \alpha_i$=being a non-zero integer.

We shall now consider $H(\lambda_i)$ the image of $E_{\lambda_i}$ by H. We shall now prove that $H(E_{\lambda_i})=F_{\lambda_i}$ and that $H^*(F_{\lambda_i})=E_{\lambda_i}$. Both properties can be shown in the same way. It can be justified thus for the first one: Let $(x_1, \ldots, x_{\alpha_i})$ be a base of $E_{\lambda_i}$, $$H^*Hx_k = \lambda_i x_k \forall k \in [1;\alpha_i] \Rightarrow HH^*(Hx_k) = \lambda_i(Hx_k) \forall k \in [1;\alpha_i]$$

Consequently $H(E_{\lambda_i}) \subset F_{\lambda_i}$.
Let us assume that there is $(\mu_1, \ldots \mu_{\alpha_i}) \in \mathbb{C}^{\alpha_i}$ verifying $\Sigma_{k=1}^{\alpha_i} \mu_k (Hx_k) = 0$;
By applying H* to this relation, we obtain:

$$\Sigma_{k=1}^{\alpha_i} \mu_k H^*Hx_k = 0 \Rightarrow \lambda_i \Sigma_{k=1}^{\alpha_i} \mu_k x_k = 0$$

Still $\lambda_i \neq 0$ hence $\Sigma_{k=1}^{\alpha_i} \mu_k x_k = 0$ $(x_1, \ldots, x_{\alpha_i})$ is a base of $E_{\lambda_i}$, it is therefore a free family. It can be deduced that:

$$(\mu_1, \ldots \mu_{\alpha_i}) = (0, \ldots 0).$$

The family $(Hx_1, \ldots, Hx_{\alpha_i})$ is thus a free family in $H(E_{\lambda_i})$ of sizes $\alpha_i$. It can be deduced that:

$$\dim(H(E_{\lambda_i})) = \dim(F_{\lambda_i})$$

$H(E_{\lambda_i}) \subset F_{\lambda_i}$ and $\dim(H(E_{\lambda_i})) = \dim(F_{\lambda_i})$, the result is thus $H(E_{\lambda_i}) = F_{\lambda_i}$. (4)

During a step $R_1$, non-zero eigenvalues $\lambda_k$ are extracted from the matrix product HH* and their associated eigenvectors $v_k$, with k an integer between 1 and p, with p≤r. p pairs $(\lambda_k, v_k)$ can then be obtained.

During a step $R_2$, using the properties which connect the eigencharacteristics of the matrix product H*H to those of the matrix product HH* to derive the eigenvectors $u_k$ of H*H, associated with non-zero eigenvalues $\lambda_k$. p pairs $(\lambda_k, u_k)$ can be obtained.

During a step $R_3$, a measurement of the signal to noise ratio ρ is used in the transmission channel CH obtained from the signal received by the receiving equipment ER and in particular the pilots transmitted in a manner known to those skilled in the art by the transmitting equipment ET.

During a step $R_4$, the eigencharacteristics of the autocorrelation matrix $Q_{opt}$ are calculated, which matrix that maximizes the capacity C of the channel, according to equation (1).

U is the name of the matrix whose columns are the eigensubespaces of H*H. This is the transition matrix from the canonical basis (natural vector basis) to the orthonormal basis formed by the eigenvectors of H*H. Λ is the matrix composed of the eigenvalues of H*H, H*H=UΛU*. In the basis formed by the eigensubspaces of H*H, the formula (1) becomes:

$$C = \int_B \log_2(\det(I_r + rt\rho U^*QU\Lambda)) df \quad (5)$$

where B designates the band of frequencies over which the data are transmitted.

The maximisation of C amounts to the maximisation, for every frequency, of the integrated term.

Let A be a matrix of size t×t defined positive, let us note $A_{ii}$ the diagonal elements of A. The Hadamard inequality is as follows:

$$\det(A) \leq \Pi_{i=1}^{t} A_{ii} \quad (6)$$

It becomes an equality when the matrix A is diagonal. This formula is for example described in the book «Inequalities: a journey into Linear Algebra» by D. J. H. Garling in 2007, page 233.

Applying this inequality in the formula (5), it is found that the capacity for each frequency f may be maximum when $I_t + \rho U^* Q U \Lambda$ is diagonal, that is to say that when $U^* Q U$ is diagonal, thus that Q is diagonalizable in the same basis as $H^* H$.

The eigensubspaces of $Q_{opt}$ thus coincident with those of $H^* H$.

Below, $\mu_i$, $i \in [[1; t]]$ designates the eigenvalue associated with the eigensubspace $E_{\lambda_i}$.

Solving the problem of optimizing the capacitance C of the transmission channel then amounts to solve the maximization problem of values that is to say:

$$\max_{\mu_i \geq 0, \Sigma \mu_i = 1} \Sigma_{i=1}^{t} \log_2(1 + rt\rho\mu_i\lambda_i) \quad (7)$$

This problem is advantageously solved using Lagrange multipliers.

The article entitled «Capacity of Multi-antenna Gaussian Channels», by E. Telatar, published in 1999 in the journal «European Transactions on Telecommunications», Vol. 10, Issue 6, pages 585-595, in November 1999, discloses a so-called water-filling process, which can be exposed as follows:

$$\mu_i = \max\left(\mu - \frac{1}{rt\rho\lambda_i}, 0\right) \quad (8)$$

where $\mu$ is a constant for checking the stress, r the number of antennas at reception and t the number of antennas at transmission:

$$\Sigma_{i=1}^{r} \mu_i = 1$$

This formulation (7) has as a first disadvantage of not giving an explicit formula for calculating µ1 and as a second disadvantage, that of not directly identifying the number of non-zero eigenvalues of $Q_{opt}$.

The inventors have found a formulation of the solution to the problem that fills both these gaps and that will now be detailed.

The eigenvallues $\lambda_i$ of $H^* H$ are classified in decreasing order ($\lambda_1 \geq \lambda_2 \geq \ldots \geq \lambda_r$).

$D_{max}$ is defined as the greatest integer verifying the following inequality:

$$\frac{1}{p_{max}}\left(1 + \sum_{j=1}^{pmax} \frac{1}{rt\rho\lambda_j}\right) > \frac{1}{rt\rho\lambda_{max}} \quad (9)$$

$p_{max}$ corresponds to the number of non-zero eigenvalues of the optimal autocorrelation matrix $Q_{opt}$.

To calculate the $p_{max}$ eigenvalues of the optimal autocorrelation matrix $Q_{opt}$, the following formula is used:

$$\mu_i = \frac{1}{p_{max}}\left(1 + \sum_{j=1}^{pmax} \frac{1}{rt\rho\lambda_j}\right) - \frac{1}{rt\rho\lambda_i} \quad (10)$$

The remaining $t - p_{max}$ eigenvalues are reset.

The $p_{max}$ pairs of eigenvalues and eigenvectors of the autocorrelation matrix $Q_{opt}$ are obtained in this way.

Alternatively, one can choose a priori to calculate a number p of pairs of eigenvalues and eigenvectors of the matrix $Q_{opt}$, such as $1 \leq p \leq p_{max}$, for example based on a predetermined criterion, such as a feedback signal format FS the constraints of computational resources of the transmitting equipment or receiving equipment or a gain provided by the pairs of eigenvalues and eigenvectors.

Knowing the equation (10), wherein $p_{max}$ is replaced with p, it is understood that this choice of p affects the calculation of the p eigenvalues µ1. An advantage is to optimize the matrix $Q_{opt}$ for the p value selected.

We shall detail below an embodiment wherein the number p is determined during the extraction of the eigenvalues $\lambda_i$ from $H^* H$.

During a step $R_5$, one inserts information relating to at least one of the p pairs in a feedback signal FS transmitted to the transmitter equipment TR via the uplink transmission channel CH'.

Figure 5:
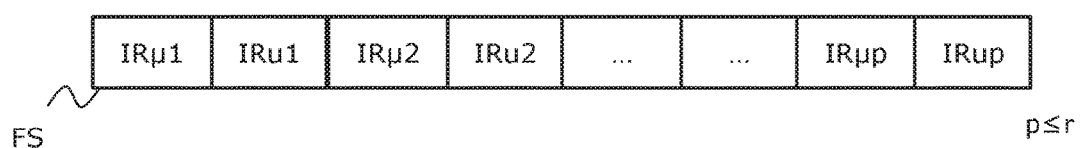
FIG. 5 shows schematically an example of feedback signal transmitted by the processing method of a payload signal according to one embodiment of the invention.

In connection with FIG. 5, an example of a feedback signal format with information representative of at least one pair of eigencharacteristics ($\mu_i$, $u_i$) of the matrix $Q_{opt}$ is shown by way of illustration. These pieces of information IRµ$_i$, IRu$_i$, are for example indices of a codebook, known commonly by the transmitter equipment as well as the receiver equipment.

In connection with FIG. 6 describes more in detail a first embodiment of step $R_1$ for extracting characteristics of the product matrix $HH^*$. According to this first embodiment of the invention, the extraction of the eigenvalues includes the following substeps:

In a sub-step $R_{11}$, a so-called power method is implemented. Such an algorithm is iterative and allows to extract the eigenvalue $\lambda_1$ of greater amplitude as follows:

We initialize the algorithm with a vector v which can be random. At each iteration of the algorithm, we multiply the vector obtained after the previous iteration by $HH^*$. After many iterations, around ten, the resulting vector is the eigenvector $v_1$ associated with the largest eigenvalue of $HH^*$. A unit eigenvector is obtained by normalizing it. The eigenvalue $\lambda_1$ sought is the norm of the normalized vector multiplied by $HH^*$.

During a step $R_{15}$, the information related to the eigenvalue $\lambda_1$ with a greater module, is subtracted from the matrix product $HH^*$ according to the following formula:

$$(HH^*)_1 = (HH^*)_0 - \lambda_1 v_1 v_{1*} \quad (11)$$

where $(HH^*)_0$ is equal to the matrix product $HH^*$ and $(HH^*)_1$ is a matrix product obtained after a first iteration of the algorithm and whose eigenvalue with a greater magnitude corresponds to the second eigenvalue with greater magnitude of $HH^*$. This is a deflation method.

It is understood that in this manner, it is possible to then iterate the power algorithm to obtain the second eigenvalue $\lambda_2$ and its associated eigenvector $v_2$. We therefore repeat the steps $R_{11}$ and $R_{12}$ that have just been described, p times, until we have p pairs of eigencharacteristics of $HH^*$, the iteration n, n is an integer≤p, to obtain the eigenvalue $\lambda_n$, the eigenvector $v_n$ and the matrix product $(HH^*)_n$.

According to a second embodiment of the invention, the processing of the substep $R_{11}$ which has just been described can be accelerated by calculating a power of the matrix $(HH^*)_n$ and by applying it to the initial random vector v. If we do not take into account the normalization, the result obtained after q iterations of the algorithm presented above is:

$$(HH^*)^q v \qquad (12)$$

where v is the initial vector.

We can therefore calculate a power of the matrix and then multiply it by v to obtain the desired eigenvector and the desired eigenvalue. To calculate a power of HH*, the following operations are carried out in succession: the matrix is squared, the result is squared and, after q iterations, generally equal to 4 or 5, the following matrix is obtained:

$$(HH^*)^{2^q} \qquad (13)$$

By applying this matrix to the vector v, we obtain the pair of eigencharacteristics corresponding to the eigenvalue with greater magnitude.

An advantage of this geometrical method is that the number q of iterations required to converge towards the direction of the eigenvector corresponding to the eigenvalue with greater magnitude is less than the number n of iterations of the previous method.

Advantageously, the intermediate powers of HH* complying with the formula (13), such as $(HH^*)^2$, $(HH^*)^{2^2}$, ... $(HH^*)^{2^{q-1}}$, can be stored in memory for the successive values of the iteration q. It is then possible to construct any power of HH* by using a product of the powers calculated.

Then, the substep $R_{15}$ of deflation as described for the previous embodiment is implemented.

The extraction step just illustrated carries out an estimate of the transmission channel H, following the reception of a data signal over that channel at a given time and over a specific portion of frequency band. As the channel properties are likely to change over time, for example due to a movement of the receiver equipment ER, the estimation is repeated regularly. Following a new estimate, the treatment method just described is again implemented. Advantageously, according to one embodiment of the invention, the power method for successively reading out the pairs of eigencharacteristics chooses for the extraction of the $i^{th}$ pair, an initial vector equal to the $i^{th}$ eigenvector v, extracted in the previous implementation of the process. Thus, if the channel has hardly changed, the convergence of the extraction method of the pairs of eigencharacteristics is much faster.

Again in connection with FIG. 6, we shall now describe a third embodiment of the extraction step $R_1$. Following extraction of a pair of eigencharacteristics $(\lambda_n, v_n$, with n being an integer strictly greater than 1, one substep $R_{12}$ of evaluating a capacity gain $Gc_n$ provided by the extracted pair is implemented.

The gain capacity $Gc_n$ is advantageously expressed as follows:

$$G_{c_n} = \frac{c_n}{c_{n-1}} \qquad (14)$$

where $C_n$ designates the capacity of the channel, while considering n main pairs of eigenvalues and associated eigenvectors.

Knowing the equation (1) which determines the capacity C of the transmission channel according to the signal to noise ratio ρ, to the autocorrelation matrix Q and the matrix product H*H, the value of capacity $C_n$ is calculated using an incomplete autocorrelation matrix $Q_n$ obtained from the n pairs of eigencharacteristics calculated. The capacity $C_{n-1}$ having been calculated in the previous iteration, the value of the gain capacity $G_{cn}$ provided by the iteration n can be deduced.

During a step $R_{13}$, the capacity gain value obtained is compared with a predetermined threshold $S_G$, for example equal to 1.2 or 1.3.

If the gain $G_{cn}$ is greater than or equal to the threshold $S_G$, we decided to take into account the pair of eigencharacteristics $(\lambda_p, v_p)$ in the further processing stage, in particular for calculating the eigencharacteristics of the optimal autocorrelation matrix $Q_{opt}$.

Otherwise, it was decided not to consider it. In this case, the processing stops, because the following specific characteristics, of lesser magnitude, will necessarily have a less significant contribution to the capacity of the transmission channel.

Advantageously, at least one other stopping criterion CA may be verified in a sub-step R14. This is for example a criterion related to a design constraint of the feedback signal, which only allows transmission of a restricted amount of information. For example, in the LTE standard, for a 20 MHz band, some hundred bits are allocated for retrieving information on the characteristics of the MIMO channel.

If this stopping criterion is satisfied, the iteration loop ends and the n=p pairs of eigencharacteristics selected, for example stored in memory M1 as iterations are performed, are encoded and then inserted into a feedback signal FS intended for the transmitter equipment ET.

If this stopping criterion is not satisfied, the subtraction sub-step R15 is implemented to determine a new matrix $(HH^*)_p$ which is treated in an iteration n+1.

It will be understood that with this embodiment of the invention, not all the non-zero eigenvalues of the matrix HH* are calculated, but only the p values, with p a non-zero integer less than or equal to $p_{max}$, which are sufficiently significant with respect to a predetermined gain threshold, within the limit set by a predetermined stopping criterion. One advantage is to make a compromise between efficiency and consumption of computing and bandwidth resources.

Advantageously, the evaluation of the capacity gains during step R12 may be implemented using tables which have been previously computed and stored in memory.

According to one embodiment of the invention, let us consider a ratio $c_n$, so-called condition number provided between the eigenvalue $\lambda_{n+1}$ calculated at iteration n+1 and the eigenvalue $\lambda_1$ calculated at the first iteration:

$$-c_n = \frac{\lambda_1}{\lambda_{n+1}} \qquad (15)$$

The capacity gain $G_{cn}$ provided by the $n^{-th}$ eigenvalue depends on $\lambda_1$, on the n−1 condition numbers and on the value of the signal to noise ratio, measured as ρ.

$$G_{c_n} = \frac{c_n}{c_{n-1}} = \frac{n}{n-1} \frac{\log_2\left(n\rho + \frac{1}{\lambda_1} + \frac{1}{\lambda_1}\sum_{i=1}^{n} c_i\right) + \log_2\left(\lambda_1^n \prod_{i=1}^{n} \frac{1}{c_i}\right)}{\log_2\left(n\rho + \frac{1}{\lambda_1} + \frac{1}{\lambda_1}\sum_{i=1}^{n-1} c_i\right) + \log_2\left(\lambda_1^{n-1} \prod_{i=1}^{n-1} \frac{1}{c_i}\right)} \qquad (16)$$

Advantageously, the pre-established tables contain entries that associate the gain value $G_{Cn}$ of corresponding capacity with specific values of the signal to noise ratio and with the condition number $C_n$. In this way, the sub-step $R_{12}$ uses far fewer calculation resources.

We now consider the special case wherein the receiver equipment ER only has two receiving antennas. The result consequently is r=2. In this case, the values stored in the tables can advantageously be shown as plots or charts such as those of FIG. 7A. Each plot corresponds to a predetermined capacity gain value and causes the provided number (shown on the ordinate) to vary according to the signal to noise ratio (shown on the ordinate). Such plots make it possible to evaluate at a glance whether a pair of eigenvalue and eigenvector provides of sufficient capacity gain on transmission to the transmitter equipment. We shall note, however, that they become usable only as of the second pair of specific characteristics.

Note also that the definition of signal to noise ratio, or SNR, used to be able to provide this plot, is not the conventional definition of the signal to noise ratio, such as the ratio ρ used until now in the description. Here we have an SNR characteristic of MIMO systems, which depends on the number of antennas for transmission and reception. The link between this SNR MIMO ratio and the SNR ratio used conventionally is defined as follows:

$$\rho_{MIMO} = r \times t \times \rho \qquad (17)$$

With the introduction of such a SNR, the gain plots of the abacus do not depend on the number of antennas in the system.

Presenting a graphical visualization mode of the capacity gain provided by an extracted pair of eigencharacteristics find a particular application for network planning. Indeed, in a given scenario, it is possible to visualise on the charts the capacity gain obtained by the addition of a second pair of eigenvalue and eigenvector in addition to a first pair. This knowledge of the number of pairs on transmission to the transmitter equipment, enables to deduce the size of the feedback path. With the invention, it becomes possible to establish a detailed mapping, showing the minimum size of the feedback path, sufficient to achieve the optimal capacity of the transmission channel.

In connection with FIG. 7B, there is illustrated an example of scenario with a transmitter equipment ET, such as a base station type transmitter equipment or eNodeB, which may comprise two transmission antennas, in a geographical area comprising building $B_1$ to $B_6$. Three receiver equipments $ER_1$ to $ER_3$, are considered, each comprising two reception antennas. These can be mobile terminals moving within the coverage area ZC of the transmitter equipment. With the invention it is sufficient to place the point (ρ, $c_2$) on the graph and to determine the nearest chart for the capacity gain provided by the second eigenvalue for a given mobile terminal at a given time and at a given position within the coverage area ZC. For example, we consider that the receiver equipment $ER_3$ has no interest in using the second eigenvalue unlike equipment $ER_1$ who gets a capacity gain of 1.65 that is to say 65%.

It goes without saying that, to define the installation points of a transmitter equipment ET, a mobile service provider may advantageously visualize from such plots the channel capacity that might be provided by a transmitting antenna within a given geographic area. Using in parallel the graphs showing the gain capacity provided by the second eigenvalue, it becomes easy to estimate the number pairs of eigenvalue and eigenvector necessary to achieve the desired capacity target and to assess the capacity loss induced by the use of a single pair.

Upon completion of the method which has just been described in relation with FIGS. 4 to 7, a feedback signal FS carrying information representative of the p pairs of characteristics of the autocorrelation matrix $Q_{opt}$ are sent over the transmission channel CH to the transmitter equipment TR. The latter must be able to identify said information received and to use them.

In connection with FIG. 8, we shall now present a method for processing the feedback signal FS received by the transmitter equipment.

During a step $T_1$, the feedback signal FS is received by the transmitter equipment ET, decoded and demodulated to extract the payload.

At $T_2$, the information representative of the p pairs of eigencharacteristics are identified in the payload of the received signal. These may be the eigenvalues and the components of their associated eigenvectors. Alternatively, the received information may comprise the square roots of the eigenvalues and the components of their associated eigenvectors.

In $T_3$, the m pairs are operated to set the MIMO precoder, that is to say, how to distribute the symbols on transmission over the plurality t of the transmission antennas of the transmitter equipment.

According to one embodiment of the invention, the step T3 comprises the following substeps:

Generating at $T_{31}$ a number of streams $N_F$ equal to the number p of pairs received;

Determinating at $T_{32}$ a mode of distributing the symbols on transmission over the p streams. As is known, this sub-step determines how to multiplex the symbols on transmission over the p streams generated;

Allocating at $T_{33}$ to the $i^{th}$ stream a power which is proportional to the square root of the $i^{th}$ eigenvalue $\mu_1$ received;

Determinating the contributions at $T_{34}$ of the p streams across the plurality T of transmission antennas $a_1$, $a_2 \ldots a_j$, $a_t$, the contribution of the $i^{th}$ stream at the $j^{th}$ antenna $a_j$ being proportional to the product of the symbol carried by the latter by a $t_i^{th}$ component $u_{i,j}$ of egenvector $u_i$. The signal on the antenna will thus be the sum of the contributions of each of the m streams.

In connection with FIG. 9, there is shown an example of the use of the m pairs of eigencharacteristics transmitted to a transmitter equipment ET comprising t=4 transmission antennas. In this example, p is equal to 3. A MIMO precoder configured according to the invention uses the three pairs by creating $N_F$=p=3 streams. The modulated symbols are distributed across these three streams. The proportion of power allocated to the $i^{th}$ stream is equals to the square root of the eigenvalue $\mu_1$. The streams are then distributed over the 4 antennas $a_1$, $a_j$, $a_t$ each with a contribution calculated as previously described from the components of the eigenvectors associated with the three eigenvalues.

It will be noted that the invention just described, can be implemented using software and/or hardware components. In this context, the terms "module" and "entity" used in this document, can be either a software component or a hardware component or even a set of hardware and/or software, capable of implementing the functions outlined for the module or entity concerned.

In relation to FIG. 10, we now present an example of simplified structure of a device 100 for processing a data signal received according to the invention. The device 100 implements the processing method according to the invention which has just been described in connection with FIGS. 4 and 6.

For example, the device 100 comprises a processing unit 110, equipped with a processor $\mu_1$ and driven by a computer program Pg1 120 stored in a memory 130 and implementing the method according to the invention.

At initialization, the code instructions of the computer program $Pg_1$ 120 are for example loaded into a RAM memory before being executed by the processor of the processing unit 110. The processor of the processing unit 110 implements the steps of the method described above, according to the instructions of the computer program 120.

In this embodiment of the invention, the device 100 comprises at least one GET unit for obtaining the eigencharacteristics of the product of the conjugate transpose of the channel matrix with the channel matrix (H*H), an MEAS unit of obtaining a measurement of a signal to noise ratio in the transmission channel, a CALC unit for calculating the eigenvalues of an autocorrelation matrix of the symbols on transmission according to a criterion of maximizing a capacity of the transmission channel, based on the eigenvalues obtained and the measurement of the signal to noise ratio, the non-zero eigenvalues ($\mu i$) of said matrix being associated with the same eigenvectors as those of the product of the conjugate transpose of the channel matrix with the channel matrix (H*H) from the following equations and a SEND unit for transmitting the eigencharacteristics obtained in the transmitter equipment.

Advantageously, the treatment device 100 further comprises an EXTRACT unit for extracting the eigencharacteristics of the product of the channel matrix with the conjugate of the channel matrix (HH*) from the estimated channel matrix. The eigencharacteristics of the matrix H*H are obtained from the extracted characteristics for the matrix product HH*, the non-zero eigenvalues of the product of the conjugate transpose of the channel matrix by the channel matrix (H*H) being identical to that of the product of the channel matrix with its conjugate (HH*), the eigenvectors ($v_i$) of the product of the conjugate transpose of the channel matrix by the channel matrix (H*H) being obtained from those of the matrix (HH*) by performing the product of the eigenvectors associated with the eigenvalues of the product of the channel matrix by its conjugate transpose with the conjugate transpose of the channel matrix (H*).

The device 100 further comprises the sub-units (not shown) corresponding to sub-steps $R_{11}$ to $R_{15}$ of the method for processing a received data signal according to one embodiment of the invention, which consists in extracting the pairs of eigencharacteristics in descending order of amplitude values, to evaluate the gain capacity provided by the current pair and decide to transmit it or not by comparing the gain measured with a predetermined threshold. The device 100 further comprises a unit $M_1$ (140) for storing pairs of eigencharacteristics extracted. Advantageously, it further stores precalculated tables of the capacity gains based on a MIMO signal to noise ratio and a condition number ratio according to one embodiment of the invention. It can also store the powers of the matrix HH* iteratively calculated to extract the eigenvalue of largest magnitude according to the power method.

These units are controlled by the processor $\mu_1$ of the processing unit 110.

Advantageously, such a device 100 can be integrated with a receiver equipment ER, such as for example a mobile user terminal TU. The device 100 is then arranged to cooperate at least with the next module of the terminal TU:
  a E/R module for transmitting/receiving data, comprising a plurality r of receiving antennas and at least one transmitting antenna, via which the payload signals are received from the transmitter equipment ET and the feedback signal FS is transmitted to the transmitter equipment ET;
  a DEC MIMO unit adapted to decode the symbols received from the plurality of receiving antennas;
  a DEMOD unit for demodulating the symbols, adapted to provide the encoded data bits,
  a channel decoding unit DEC adapted to provide the payload data bits from the encoded bits; and
  an EST H unit for estimating the transmission channel from the received data signal DS.

In relation to FIG. 11, we now present an example of simplified structure of a device 100 for processing a feedback signal according to the invention. The device 200 implements the processing method according to the invention which has just been described in connection with FIGS. 8 and 9.

For example, the device 200 comprises a processing unit 210, equipped with a processor $\lambda 2$ and driven by a computer program $Pg_2$ 220 stored in a memory 230 and implementing the decoding method according to the invention.

At initialisation, the code instructions of the computer program $Pg_2$ 220 are for example loaded into a RAM before being executed by the processor of the processing unit 210. The processor of the processing unit 210 implements the steps of the method described above, according to the instructions of the computer program 220.

In this embodiment of the invention, the device 200 comprises a unit GET for obtaining information representative of m groups s of eigencharacteristics received in the decoded feedback signal, with m greater than or equal to 1, and a unit CONF MIMO for configuring a distribution of symbols on transmission over the plurality of transmission antennas based on said at least one pair obtained.

Advantageously, the configuration unit of a distribution of symbols on transmission or MIMO precoding comprises the following sub-units (not shown):
  Generating at a number of streams $N_F$ equal to the number of m pairs received;
  Determining a mode of distribution of the symbols on transmission over the m streams. As is known, this sub-step determines how to multiplex the symbols on transmission over the m streams generated;
  Allocating to the $i^{th}$ stream a power which is proportional to the square root of the $i^{th}$ eigenvalue $\mu_1$ received;
  Determining the contributions of the m streams across the plurality t of transmission antennas a1, a2 ... aj, at, the contribution of the $i^{th}$ stream at the $i^{th}$ antenna $a_j$ being proportional to the product of the symbol carried by the latter by a $t^{ith}$ component $u_{i,j}$ of the eigenvector $u_i$. The signal on the antenna will thus be the sum of the contributions of each of the m streams.

The device further comprises a unit $M_2$ (140) for storing the pairs of eigencharacteristics received.

These units are controlled by the processor $\mu 2$ of the processing unit 210.

Advantageously, such a device 200 can be integrated with a transmitter equipment ET, such as for example a base station SB. The device 200 is then arranged to cooperate at least with the following modules of the transmitter equipment:
  a E/R module for transmitting/receiving data, comprising the plurality t of transmission antennas and at least one receiving antenna, via which the payload signals are transmitted by the transmitter equipment ET and the feedback signal FS is received from the receiving equipment ER;

a channel coding module ENC adapted to encode the payload data, a modulation MOD module adapted to provide symbols from the encoded data;

a PRECOD MIMO module for distributing the symbols on transmission over the plurality of transmitting antennas depending on the configuration established;

a module DEC' for decoding a feedback signal FS. Similarly to the receiving equipment, such a module comprises at least one unit for decoding the signal into symbols, a unit for demodulating the symbols into encoded data and a channel decoding unit, all known to those skilled in the art.

It goes without saying that the embodiments which have been described above have been given by way of purely indicative and non-limiting example, and that many modifications can be easily made by those skilled in the art without departing from the scope of the invention.

The invention claimed is:

1. A method for setting a multiple-input, multiple-output (MIMO) precoder of a transmitter, comprising:

processing information representative of a transmission channel between radio equipment, called a receiver, comprising a plurality (r) of receiving antennas and at least one transmitting antenna, and radio equipment corresponding to the transmitter comprising a plurality (t) of transmission antennas paired with the MIMO precoder and at least one receiving antenna, the number of transmission antennas (t) being greater than the number of receiving antennas (r), said information comprising a matrix (H) representative of the transmission channel estimated beforehand from at least one received data signal, said processing comprising the following acts performed by the receiver:

obtaining at least one pair of eigen characteristics of the product of the conjugate transpose of the channel matrix with the channel matrix (H*H), consisting of non-zero eigenvalues ($\lambda_i$) and eigenvectors ($u_i$) associated with said eigenvalues;

measuring a signal to noise ratio ($\rho$) in the transmission channel;

calculating at least one eigenvalue ($\mu_i$) of an autocorrelation matrix of symbols on transmission, according to a criterion of maximizing a capacity (C) of the transmission channel, from the eigenvalues ($\lambda_i$) obtained, arranged in descending order and the measurement of the signal to noise ratio ($\rho$), according to the following equations:

$$0 \le p \le \mathrm{argmax}_{m \le r} m^{-1}\left(1 + (rt\rho)^{-1}\sum_{k \le m}\lambda_k^{-1}\right) > (rt\rho\lambda_m)^{-1}$$

$$\mu_i = \frac{1}{p}\left(1 + \sum_{j=1}^{p}\frac{1}{rt\rho\lambda_j}\right) - \frac{1}{rt\rho\lambda_i} \text{ for } 1 \le i \le p$$

$$\mu_i = 0, \text{ for } p < i \le t$$

p being the number of calculated eigenvalues, and m, k and i being positive integers, the non-zero eigenvalue ($\mu_i$) of the autocorrelation matrix being associated with the same eigenvector ($\mu_i$) as the eigenvalue ($\lambda_i$) of the product of the conjugate transpose of the channel matrix with the channel matrix (H*H);

transmitting, to the transmitter, information representative of said at least one calculated non-zero eigenvalue ($\mu_i$) associated with the eigenvector ($\mu_i$); and receiving symbols distributed by the transmitter on transmission over the plurality (t) of transmission antennas of the transmitter, based on said information.

2. The method according to claim 1, further comprising extracting at least one pair of eigen characteristics of the product of said matrix channel with the conjugate transpose of the channel matrix from the estimated channel matrix, said at least one pair comprising at least one non-zero eigenvalue ($\lambda_i$) and an associated eigenvector ($v_i$) and, the non-zero eigenvalues of the product of the conjugate transpose of the channel matrix by the channel matrix (H*H) being identical to that of the product of the channel matrix with its conjugate transpose (HH*), the at least one eigenvector ($\mu_i$) of the product of the conjugate transpose of the channel matrix by the channel matrix (H*H) is obtained by performing the product of the eigenvector ($v_i$) associated with the at least one eigenvalue extracted from the product of the channel matrix by its conjugate transpose (HH*) with the conjugate transpose (H*) of the channel matrix.

3. The method according to claim 2, wherein the extracting the eigenvalues of the product of the channel matrix by its conjugate transpose (HH*) extracts said at least one eigenvalue in order of decreasing values and comprises the following sub-acts:

extracting a pair ($\lambda_1$, $v_1$) comprising the eigenvalue ($\lambda_1$) with greater amplitude and its associated eigenvector by successive iterations of the product of the channel matrix (H) with an initial vector v of dimension r, said iterations being repeated until there is convergence towards a eigen direction of the transmission channel;

obtaining a new matrix $(HH^*)_1$ by subtracting a product of the pair extracted from the product of the channel matrix by its conjugate transpose (HH*);

and wherein said sub-acts are repeated as long as a predetermined stopping criterion is not satisfied.

4. The method for processing information representative of a transmission channel according to claim 2, wherein the extracting the eigenvalues of the product of the channel matrix by its conjugate transpose (HH*) extracts the eigenvalues in order of decreasing values and comprises the following sub-acts:

iteratively calculating at least one geometrical power of the matrix that is the product of the channel matrix with its conjugate transpose $(HH^*)^{2n}$, the number of iterations n being based on a predetermined convergence criterion;

extracting a pair ($\lambda_1$, $v_1$) comprising the eigenvalue ($\lambda_1$) with greater amplitude and its associated eigenvector by the product of at least one calculated geometric power $(HH^*)^{2n}$ with an initial vector of dimension (r);

obtaining a new matrix $(HH^*)_1$ by subtracting a product of the extracted pair from the product of the channel matrix by its conjugate transpose (HH*);

and wherein said sub-acts are repeated as long as a predetermined stopping criterion is not satisfied.

5. The method according to claim 2, further comprising a sub-act of evaluating a capacity gain ($G_C$) associated with an $n^{th}$ eigenvalue extracted from a ratio between a first flowrate capacity ($C_{n-1}$) associated with the n−1 preceding eigenvalues and a second capacity (Cn) associated with the n current eigenvalues, a sub-act of deciding to take into account the $n^{th}$ eigenvalue by comparing the calculated capacity gain ($G_C$) associated with the $n^{th}$ eigenvalue with respect to a predetermined threshold ($S_C$).

6. The method according to claim 3, following a new estimate of the transmission channel (H), the acts of the method are repeated and the sub-act of extracting an $i^{th}$ pair ($\lambda'_i$, $v_i$) takes as the initial vector the $i^{th}$ eigenvector $v_i$ extracted during the previous implementation of the method.

7. A receiver for setting a multiple-input, multiple-output (MIMO) precoder of a transmitter by processing information representative of a transmission channel between radio equipment corresponding to the receiver comprising a plurality (r) of antennas and at least one transmitting antenna, and radio equipment corresponding to the transmitter comprising a plurality (t) of transmission antennas paired with the MIMO precoder and at least one receiving antenna, the number of transmitting antennas (t) being greater than the number of receiving antennas (r), said information comprising a matrix (H) representative of the transmission channel estimated beforehand from at least one received data signal, said receiver comprising:
- a processor; and
- a non-transitory computer-readable medium comprising instructions stored thereon, which when executed by the processor configure the device to perform acts comprising:
- obtaining at least one pair of eigen characteristics of the product of the conjugate transpose of the channel matrix with the channel matrix (H*H), consisting of non-zero eigenvalues ($\lambda_i$) and eigenvectors (ui) associated with said eigenvalues;
- measuring a signal to noise ratio ($\rho$) in the transmission channel;
- calculating at least one eigenvalue ($\mu_i$) of a autocorrelation matrix of symbols on transmission, according to a criterion of maximizing a capacity (C) of the transmission channel, from the eigenvalues ($\lambda_i$) obtained, arranged in descending order and the measurement of the signal to noise ratio ($\rho$), according to the following equations:

$$0 \le p \le \mathrm{argmax}_{m \le r} m^{-1} \left(1 + (rt\rho)^{-1} \sum_{k \le m} \lambda_k^{-1}\right) > (rt\rho\lambda_m)^{-1}$$

$$\mu_i = \frac{1}{p}\left(1 + \sum_{j=1}^{p} \frac{1}{rt\rho\lambda_j}\right) - \frac{1}{rt\rho\lambda_i} \text{ for } 1 \le i \le p$$

$$\mu_i = 0, \text{ for } p < i \le t$$

p being the number of calculated eigenvalues, and m, k and i being positive integers, the non-zero eigenvalue ($\mu_i$) of the autocorrelation matrix being associated with the same eigenvector ($\mu_i$) as the eigenvalue ($\lambda_i$) of the product of the conjugate transpose of the channel matrix with the channel matrix (H*H);
- transmitting, to the transmitter information representative of said at least one calculated non-zero eigenvalue ($\mu_i$) associated with the eigenvector ($\mu_i$); and
- receiving symbols distributed by the transmitter on transmission over the plurality (t) of transmission antennas of the transmitter, based on said information.

8. A non-transitory computer-readable medium comprising a computer program stored thereon, which includes instructions for implementing a method for setting a multiple-input, multiple-output (MIMO) precoder of a transmitter when executed by a processor of a processing device of a receiver, wherein the instructions configure the receiver to perform acts comprising:
- processing information representative of a transmission channel between radio equipment, corresponding to the receiver, comprising a plurality (r) of receiving antennas and at least one transmitting antenna, and radio equipment corresponding to the transmitter comprising a plurality (t) of transmission antennas paired with the MIMO precoder and at least one receiving antenna, the number of transmission antennas (t) being greater than the number of receiving antennas (r), said information comprising a matrix (H) representative of the transmission channel estimated beforehand from at least one received data signal, said processing comprising:
- obtaining at least one pair of eigen characteristics of the product of the conjugate transpose of the channel matrix with the channel matrix (H*H), consisting of non-zero eigenvalues ($\lambda_i$) and eigenvectors ($\mu_i$) associated with said eigenvalues;
- obtaining a measurement of a signal to noise ratio ($\rho$) in the transmission channel;
- calculating at least one eigenvalue ($\mu_i$) of an autocorrelation matrix of symbols on transmission, according to a criterion of maximizing a capacity (C) of the transmission channel, from the eigenvalues ($\lambda_i$) obtained, arranged in descending order and the measurement of the signal to noise ratio ($\rho$), according to the following equations:

$$0 \le p \le \mathrm{argmax}_{m \le r} m^{-1} \left(1 + (rt\rho)^{-1} \sum_{k \le m} \lambda_k^{-1}\right) > (rt\rho\lambda_m)^{-1}$$

$$\mu_i = \frac{1}{p}\left(1 + \sum_{j=1}^{p} \frac{1}{rt\rho\lambda_j}\right) - \frac{1}{rt\rho\lambda_i} \text{ for } 1 \le i \le p$$

$$\mu_i = 0, \text{ for } p < i \le t$$

p being the number of calculated eigenvalues, and m, k and i being positive integers, the non-zero eigenvalue ($\mu_i$) of the autocorrelation matrix being associated with the same eigenvector ($u_i$) as the eigenvalue ($\lambda_i$) of the product of the conjugate transpose of the channel matrix with the channel matrix (H*H);
- transmitting, to the transmitter, information representative of said at least one calculated non-zero eigenvalue ($\mu_i$) associated with the eigenvector ($u_i$); and
- receiving symbols distributed by the transmitter on transmission over the plurality (t) of transmission antennas of the transmitter, based on said information.

9. The method according to claim 4, following a new estimate of the transmission channel (H), the acts of the method are repeated and the sub-act of extracting an $i^{th}$ pair ($\lambda'_i$, $v_i$) takes as the initial vector the $i^{th}$ eigenvector $v_i$ extracted during the previous implementation of the method.

10. The method according to claim 1, further comprising the following act performed by the transmitter:
- distributing the symbols on transmission over the plurality (t) of transmission antennas of the transmitter, based on said information.

* * * * *